(12) United States Patent
Xie

(10) Patent No.: US 12,715,158 B1
(45) Date of Patent: Aug. 25, 2026

(54) ENGINEERED STONE SLAB, AND APPARATUS AND METHOD FOR CREATING

(71) Applicant: Alex Xie, West Windsor, NJ (US)

(72) Inventor: Alex Xie, West Windsor, NJ (US)

(73) Assignee: SQIP, LLC, Orlando, FL (US)

( * ) Notice: Subject to any disclaimer, the term of this patent is extended or adjusted under 35 U.S.C. 154(b) by 0 days.

(21) Appl. No.: 19/443,702

(22) Filed: Jan. 8, 2026

(51) Int. Cl.

| | |
|---|---|
| ***B28B 1/00*** | (2006.01) |
| ***B28B 3/12*** | (2006.01) |
| ***B28B 11/16*** | (2006.01) |
| ***B29C 43/28*** | (2006.01) |
| ***B29C 43/30*** | (2006.01) |
| ***B29C 43/34*** | (2006.01) |
| ***B29C 48/35*** | (2019.01) |
| ***B29C 70/50*** | (2006.01) |
| ***B44F 9/04*** | (2006.01) |

(52) U.S. Cl.
CPC .............. *B28B 1/005* (2013.01); *B28B 3/126* (2013.01); *B28B 11/16* (2013.01); *B29C 43/28* (2013.01); *B29C 43/30* (2013.01); *B29C 43/305* (2013.01); *B29C 43/34* (2013.01); *B29C 48/35* (2019.02); *B29C 70/504* (2013.01); *B44F 9/04* (2013.01)

(58) Field of Classification Search
CPC ........... B28B 1/005; B28B 3/126; B28B 3/14; B28B 3/16; B28B 3/12; B44F 9/04; B29C 70/504; B29C 70/506; B29C 48/0021; B29C 48/288; B29C 48/2886; B29C 43/006; B29C 43/24–305; B29C 2043/3427; B29C 43/20; B28C 48/35
See application file for complete search history.

(56) References Cited

U.S. PATENT DOCUMENTS 1,818,009 A * 8/1931 Robinson .................. B28B 3/12 156/550
2,338,960 A * 1/1944 Nottebohm ............ D04H 1/593 156/332
2,590,186 A * 3/1952 Land ................... B29C 48/9135 425/84
2,626,458 A * 1/1953 Lieberman ............. B24D 18/00 428/932
2,917,821 A * 12/1959 Fritsch ...................... B22F 3/18 264/294

(Continued)

FOREIGN PATENT DOCUMENTS

CN 1669755 A 3/2004
CN 1718403 A 1/2006

(Continued)

*Primary Examiner* — Jeffrey M Wollschlager
(74) *Attorney, Agent, or Firm* — Walter J. Tencza, Jr.

(57) ABSTRACT

A method which includes depositing fine fragments of composite material into a substantially vertically oriented preform funnel to form a substantially predetermined patterned preform of fine fragments of composite material; and extruding the predetermined patterned preform of fine fragments of composite material out of a bottom opening of the preform funnel by use of at least one pair of extruding rollers to form a ribbon of composite material. The at least one pair of extruding rollers may be configured to cause a reinforcement film to be pressed onto each of at least two major surfaces of the ribbon of composite material.

25 Claims, 7 Drawing Sheets

(56) References Cited

U.S. PATENT DOCUMENTS 3,008,862 A * 11/1961 Haine ............... B29C 66/83413 156/308.4
3,076,706 A * 2/1963 Stevens ..................... B22F 3/18 419/31
3,137,601 A * 6/1964 Menzer ................... E04F 21/08 156/550
3,290,145 A * 12/1966 Stevens ................. C22C 1/1084 419/50
3,417,169 A * 12/1968 Gaul ..................... B29C 44/445 264/DIG. 10
3,542,623 A * 11/1970 Sonneborn .............. B29C 53/24 156/550
3,761,217 A * 9/1973 Mambretti .............. B29B 7/568 425/363
3,888,716 A * 6/1975 Morse ..................... B32B 27/36 156/324
4,269,884 A * 5/1981 DellaVecchia .......... B32B 37/00 156/244.11
4,372,997 A * 2/1983 Fritze ........................ E04B 1/94 428/920
4,436,682 A * 3/1984 Knopp .................... B29C 43/24 264/126
4,680,155 A 7/1987 Rochefort et al.
4,696,867 A * 9/1987 Eastwood ............. F16C 33/121 29/527.3
4,759,170 A * 7/1988 Sawa .................. B29C 66/8491 53/551
5,256,222 A * 10/1993 Shepherd ................ B28B 3/123 156/45
5,741,457 A 4/1998 Lida
6,163,961 A * 12/2000 McMeekin ............. F16C 33/14 29/898.056
6,251,974 B1 * 6/2001 Rossi ....................... C08K 5/20 524/229
7,875,132 B2 * 1/2011 Pandey ................... C22C 21/00 148/415
9,186,810 B1 11/2015 Grzeskowiak, II
9,511,516 B2 12/2016 Xie
9,707,698 B1 7/2017 Xie
10,035,733 B1 7/2018 Xie
10,233,032 B1 3/2019 Xie
10,376,912 B2 8/2019 Xie
10,399,257 B1 9/2019 Xie
10,751,911 B2 8/2020 Toncelli
10,843,977 B2 11/2020 Xie
12,226,931 B1 2/2025 Xie
2003/0198122 A1 * 10/2003 Johnson ................ B28B 13/022 106/712
2004/0137171 A1 7/2004 Choi et al.
2006/0278330 A1 * 12/2006 Kim ...................... B29C 48/001 156/243
2007/0057408 A1 3/2007 Sandqvist et al.
2008/0079185 A1 4/2008 Jamrussamee
2008/0081882 A1 * 4/2008 Tian ..................... C09D 167/02 525/444
2010/0005968 A1 * 1/2010 Endo ....................... B32B 15/16 96/6
2010/0297424 A1 * 11/2010 Romes .................... B32B 15/20 427/427.4
2011/0016720 A1 * 1/2011 Plaskett ................... B28D 1/30 29/897.3
2013/0142989 A1 * 6/2013 Wallick ................... B29C 43/24 428/114
2015/0042006 A1 2/2015 Kager
2015/0224529 A1 * 8/2015 Hamabe ................ B05C 11/025 118/200
2017/0355101 A1 12/2017 Toncelli
2018/0194164 A1 7/2018 Benito Lopez et al.
2019/0105800 A1 4/2019 Xie
2019/0143743 A1 5/2019 Kwak
2019/0201928 A1 7/2019 Xie
2019/0358851 A1 11/2019 Babini
2021/0229313 A1 7/2021 Rodriguez Garcia et al.
2022/0048216 A1 2/2022 Toncelli
2022/0097258 A1 3/2022 Toncelli
2025/0120333 A1 * 4/2025 Douglas ................. A01C 7/004

FOREIGN PATENT DOCUMENTS

CN 108127767 3/2021
EP 1005967 A1 6/2000
EP 1319486 A2 6/2003
EP 1793174 A2 6/2007
EP 2065150 A1 11/2007
ES 2713776 B2 5/2019
JP S 62199412 A 9/1987
JP S 63134205 A 6/1988
KR 102615745 B1 12/2023
WO WO2005090034 A1 9/2005
WO WO2022/172242 A1 8/2022

* cited by examiner

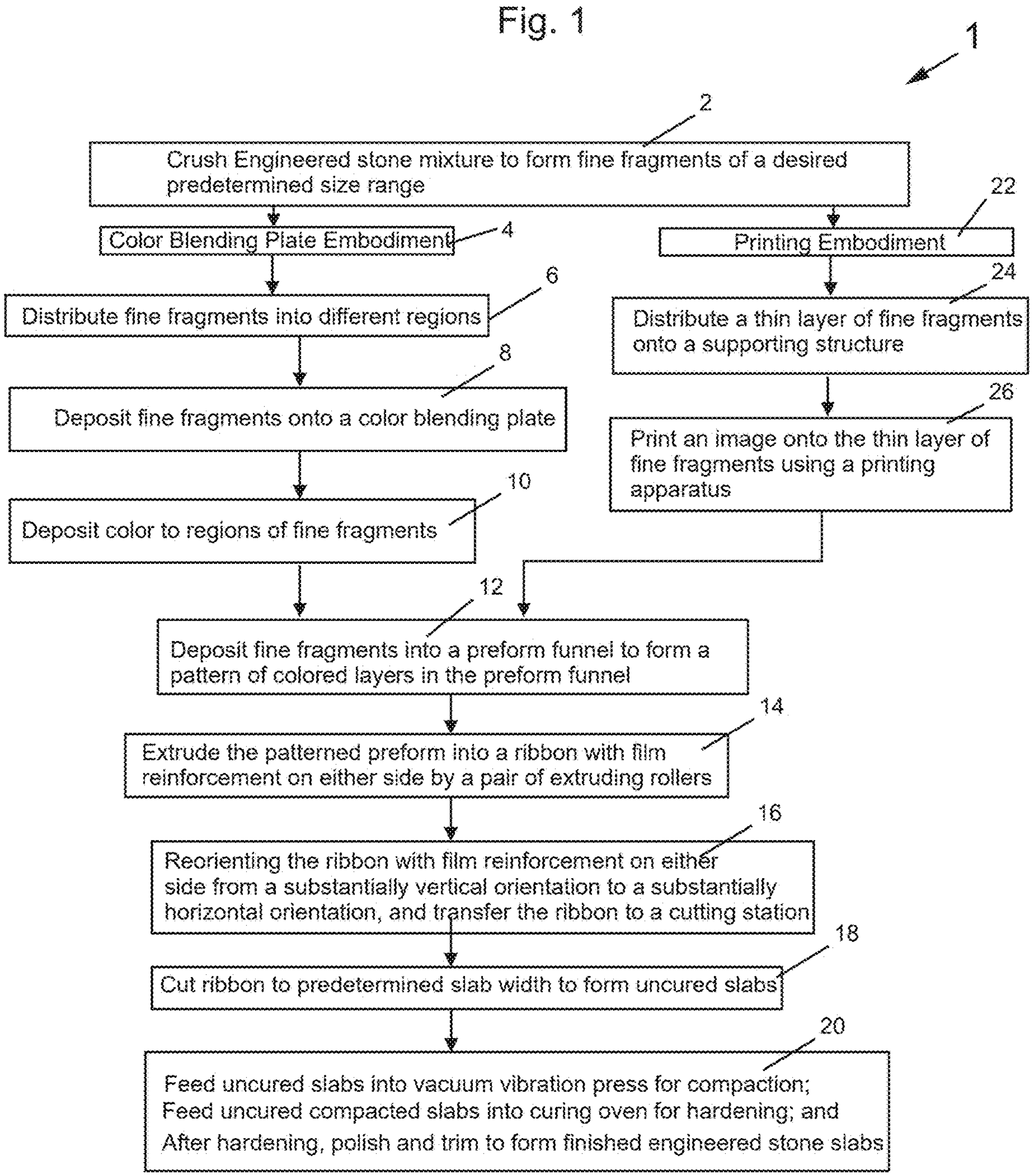
Fig. 1
1
2
Crush Engineered stone mixture to form fine fragments of a desired predetermined size range
22
Color Blending Plate Embodiment
4
Printing Embodiment
6
Distribute fine fragments into different regions
24
Distribute a thin layer of fine fragments onto a supporting structure
8
Deposit fine fragments onto a color blending plate
26
Print an image onto the thin layer of fine fragments using a printing apparatus
10
Deposit color to regions of fine fragments
12
Deposit fine fragments into a preform funnel to form a pattern of colored layers in the preform funnel
14
Extrude the patterned preform into a ribbon with film reinforcement on either side by a pair of extruding rollers
16
Reorienting the ribbon with film reinforcement on either side from a substantially vertical orientation to a substantially horizontal orientation, and transfer the ribbon to a cutting station
18
Cut ribbon to predetermined slab width to form uncured slabs
20
Feed uncured slabs into vacuum vibration press for compaction;
Feed uncured compacted slabs into curing oven for hardening; and
After hardening, polish and trim to form finished engineered stone slabs

ENGINEERED STONE SLAB, AND APPARATUS AND METHOD FOR CREATING

FIELD OF THE INVENTION

This invention relates to engineered stone slabs and apparatuses and methods for creating them.

BACKGROUND OF THE INVENTION

Quartz is the second most abundant mineral in the Earth's crust and one of the hardest naturally occurring materials. One of its many uses is in "engineered stone". Engineered stone, including quartz, has become a common surfacing and countertop choice in many countries throughout the world. Its applications include kitchen and bathroom countertops, tables and desktops, floor tile, food service areas, wall cladding, and various other horizontal and vertical applications.

There is significant pressure in the building material industry, like ceramic tiles, glass panels, cement boards, engineered stones, etc. to mimic the appearance of natural stone in their products by using many different technologies. Natural stones, such as marble, travertine, sandstones, and other kinds of stones, possess a natural beauty that is highly appreciated by consumers. Natural stone slabs are normally obtained by slicing desired thicknesses out of a large stone block. If a particular type of natural stone contains color and veining, almost all slices of the slabs will have at least some of the color and veining throughout the thickness of the slab, and very commonly have the color and veining extending throughout the length and width of the slab. This is a desired characteristic and natural stone blocks are specifically cut and processed in manners to have this appearance.

The production of engineered stone generally involves particulate materials such as ground quartz rock, crushed glass, rocks, pebbles, sand, shells, silicon, feldspar, aluminum hydroxide, other minerals, other inorganic materials, and any combination of or single ingredient combined with polymers, binders, resins, colorants, dyes, etc. The particulate material(s) may have varying sizes ranging from four hundred mesh particle size to four mesh particle size with multiple materials of different sizes used simultaneously. The polymer(s) may include agents such as a binder, hardener, initiator, or combination of such. The particulate material(s) and polymers, binders, resins, colorants, dyes, etc. are then mixed in a high speed mixer resulting in a slightly damp engineered stone composite mixture. The proportion of resin in this mixture typically accounts for about 6%-17% of the total weight of the mixture, depending on the design requirements and subsequent color and veining formation and molding processes. The lower the resin content, the drier the resulting mixture out of the high-speed mixer will be. As the resin is an uncured viscous binder, there is a tendency for fragments of the composite mixture to stick together. The remainder of the engineered stone composite material is primarily comprised of mineral filler, about 83%-94%. This initial mixture may be processed through a crushing machine to reduce the size of the combined mixture. A commonly used device for this is called a "lump breaker", in which the size of the resulting fragments of the mixture may be controlled. If the resin content is higher, the resulting mixture will be more damp or wet and softer. After subsequent processing, for example through the lump breaker, the higher resin content fragments of composite material will have more of a tendency to stick together compared to a drier composite mixture comprised of less resin. Forces acting on the fragments of composite material such as gravity or material handling such as transferring, as well as time, may cause these fragments to stick together and form larger fragments. Even for less resin formulations the surface of the fragments of composite material may be sticky due to the viscous properties of the resin. Therefore, dry colorant powder or liquid pigments can readily stick to the outer surface of the drier particles or fragments.

It's important to note that the surface smoothness of the mineral particles, the size and number of micropores on the surface of the mineral particles, etc., all affect the "wetness" and "stickiness" of the mixture. For example, in a certain engineered stone mixture formula, if the same particle size and resin percentage are used, and all other conditions of the formula are the same, using glass particles as the mineral aggregate will result in a higher "wetness" and "stickiness" of the final engineered stone mixture compared to using cristobalite particles as the mineral aggregate. This is because when observed under a microscope, glass particles have a smooth surface with no pores, while cristobalite particles have many micropores, which can absorb more resin.

The larger the mesh size of the mineral aggregate particles in the formula (i.e., the smaller the particle size of the particles and powder), the larger the total surface area of all the particles and powder that the resin needs to cover after the mixture is thoroughly stirred and mixed, under the same resin content and other conditions. This results in a "drier" consistency of the final artificial stone mixture. The terms "slightly wet," "sticky," "slightly soft," and "dry" as used in this specification refer to the consistency of the engineered stone mixture, which is mainly caused by the amount of resin, not by water. Water is minimized as a contaminant in the processing of engineered stone slabs.

The resultant composite mixture may be poured into a supporting mold, tray, film, conveyor belt, or other supporting structure. The combination of various composite mixtures, and the manipulation of the composite material, may be considered a color formation step in the processing of engineered stone. Various techniques are known in the art for processing these composite mixtures to achieve a desired final aesthetic, generally to mimic the appearance of a certain type of natural stone as closely as possible. The supporting structure containing the damp mixture is then moved by a conveyor belt into a vacuum press machine, which presses the mixture into a damp uncured "slab". It's important to know the mixture may be slightly pressed prior to the vacuum press into a damp uncured slab, however these techniques still allow for the manipulation of the material comprising the slab. After processing via a vacuum press machine, normally the material is compacted to the point that it can no longer be manipulated for purposes of color formation. The uncured slab is then placed into a curing oven to be heated into a hardened engineered stone slab. After curing, the hardened slab is generally moved to a grinder to be grinded down to a desired thickness, followed by a polisher to finish the product.

If a pigment is added when mixing the ingredients of the composite material in a high-speed mixer and is thoroughly stirred, the resultant mixture will be a monochrome engineered stone mixture close to the color of the colorant used. Additional pigment or colorant may be added to these monochrome mixtures, or these monochrome mixtures may be combined to form various patterns or movement to simulate the appearance of the certain type of natural stone. The processing step after the composite mixtures are obtained and before the material enters the vacuum press may be considered the color and veining formation process. There are numerous techniques and methods that may be used during this color formation process.

The smaller the fragments of the engineered stone composite mixture, the easier it is to arrange the fine fragments on the surface of a supporting structure as needed, resulting in a variegated pattern with transitional or gradient colors to better simulate certain types of natural stone. If the mixture particles or fragments are larger and monochrome, and because the colorant or pigment can usually only be deposited on the surface of these fragments, it is more difficult to arrange large pieces of fragments with color on the surface as required, and the formation of a variegated pattern with transitional or gradient colors can only simulate appearances with sharp color transition that are limited due to the size of the fragment, resulting in an appearance of the final engineered stone slab that looks mechanical and unnatural. The colorant only coats the outer surface of the fragments. When the fragments are pressed in the vacuum compacting machine, the monochrome fragments are pressed and the interior monochrome color inside fragments will be revealed and come into contact with the colorant coating the fragments, resulting in a sharp color transition. This is analogous to how finer-grained particles of varying colors yield higher-resolution patterns, whereas coarser particles (or larger blocks) result in lower-resolution patterns.

The combined mixtures may then be further processed in a vibration and compaction step under a vacuum, cured, then calibrated and polished to obtain a finished engineered stone slab with variegated color striations that simulate natural stone.

It is important to note that if the resin content in the mixture is too low, the fragments in the artificial stone mixture will not compact and bond effectively during the vacuum vibration pressing process after material distribution and color formation, preventing the formation of a dense slab. Therefore, it is typically necessary to balance two requirements: first, to achieve the smallest possible fragment size for the engineered stone mixture after crushing in the lump breaker in order to have a better colorant coating to achieve a higher resolution color distribution, while preventing the finely crushed particles from re-agglomerating into larger lumps or fragments during production (to achieve this, resin content should be kept as low as possible, Second, to ensure that the resultant mixture, after completing the color formation process, can be compacted into a dense uncured slab during the conventional vacuum vibration pressing process (i.e., resin content must not be excessively low).

In the prior art such as U.S. Pat. Nos. 9,718,303, 9,511,516, EP1005967A1, EP2065150A1, CN1718403A and U.S. Pat. No. 4,680,155A the concept of using gravity to drop different colored materials into a vertically positioned mold are disclosed. However, there is a processing limitation that a mold must be present that is rotated from vertical to horizontal, adding complexity and processing time.

In the prior art such as U.S. Pat. Nos. 97,076,898 and 12,226,931, there are processing steps that include the use of rollers or press rollers, however these are used in a horizontal orientation and do not perform a continuous extrusion process assisted by forming a desired pattern by use of a vertical or substantially non-horizontal funnel.

SUMMARY OF THE INVENTION

Using the production process described herein, it creates engineered stone slabs featuring natural, irregular layered textures reminiscent of those in travertine.

In at least one embodiment, the present invention provides a method which includes depositing fine fragments of composite material into a substantially vertically oriented preform funnel to form a substantially predetermined patterned preform of fine fragments of composite material; extruding the predetermined patterned preform of fine fragments of composite material out of a bottom opening of the preform funnel by use of at least one pair of extruding rollers to form a ribbon of composite material; and wherein the at least one pair of extruding rollers is configured to cause a reinforcement film to be pressed onto each of at least two major surfaces of the ribbon of composite material.

The method may further include reorienting the ribbon of composite material from a substantially vertical orientation to a substantially horizontal orientation, after the ribbon of composite material has been extruded out of the bottom opening of the preform funnel, and after the reinforcement film has been pressed onto each of at least two major surfaces of the ribbon of composite material.

The method may further include cutting the ribbon of composite material, after the ribbon of composite material has been extruded out of the bottom opening of the preform funnel, after the reinforcement film has been pressed onto each of at least two major surfaces of the ribbon of composite material, and after the ribbon of composite material has been reoriented from the substantially vertical orientation to the substantially horizontal orientation; and wherein the step of cutting the ribbon of composite material includes cutting the ribbon of composite material to a predetermined length to form an uncured slab.

In at least one embodiment, the method may further include subjecting the uncured slab to a vacuum compression process to form a compressed uncured slab; curing the uncured slab into a hardened slab; and trimming and polishing the hardened slab to form a finished slab.

In at least one embodiment, the step of cutting the ribbon of composite material includes cutting the ribbon of composite material to form two uncured slabs, each having a predetermined length.

In at least one embodiment, the step of cutting the ribbon of composite material includes cutting the ribbon of composite material to form a plurality of uncured slabs, each having a predetermined length.

In at least one embodiment, the pattern of the ribbon of composite material, after being extruded from the at least one pair of extruding rollers, is of an appearance which is substantially the same as the predetermined patterned preform.

In at least one embodiment, the method further includes depositing a first layer of fine fragments of composite material onto a supporting structure; and depositing colorant onto at least some portions of the first layer of fine fragments of composite material to form a colored first layer of fine fragments of composite material; and wherein the colored first layer of fine fragments of composite material are the fine fragments of composite material which are deposited into the substantially vertically oriented preform funnel.

In at least one embodiment, after the first layer of fine fragments has been deposited into the substantially vertically oriented preform funnel, depositing a second layer of fine fragments of composite material onto the supporting structure; and depositing colorant onto at least some portions of the second layer of fine fragments of composite material to form a printed second layer of fine fragments of composite material; and depositing the colored second layer of fine fragments into the substantially vertically oriented preform funnel.

In at least one embodiment, after the first layer of fine fragments has been deposited into the substantially vertically oriented preform funnel, depositing a plurality of further layers of fine fragments of composite material onto the supporting structure; and depositing colorant onto the plurality of further thin layers of fine fragments of composite material to form colored further layers of fine fragments of composite material; and depositing the colored further layers of fine fragments into the substantially vertically oriented preform funnel.

The method may further include detecting the height of the combination of the plurality of layers of fine fragments while in the preform funnel; and causing the extruding rollers to start extruding the predetermined pattern preform of the layers of fine fragments of composite material out of the bottom opening of the preform funnel when a height of the combination of the plurality of layers of fine fragments reaches a maximum threshold level for a level detection sensor.

In at least one embodiment, fine fragments of composite material are continuously deposited into the preform funnel as the at least one pair of extruding rollers extrudes the fine fragments of composite material In at least one embodiment, after the at least one pair of extruding rollers begins to extrude the fine fragments of composite material, a low level detection sensor detects the height of the fine fragments in the preform funnel, and stops the extruding rollers when the height of the fine fragments reaches a minimum threshold level for the low level detection sensor.

In at least one embodiment, after the extruding rollers begin to extrude the fine fragments of composite material, a high level detection sensor detects the height of the fine fragments in the preform funnel, and starts the extruding rollers when the height of the fine fragments reaches the maximum threshold height for the high level detection sensor.

In at least one embodiment, prior to being deposited into the preform funnel, the fine fragments of composite material are controllably deposited onto an angled color blending plate; and controllably depositing colorant onto predefined regions of the fine fragments of composite material as the fine fragments travel down the color blending plate.

The ribbon of composite material may be resin and mineral based comprising a minimum of 6% resin and a minimum of 83% mineral filler.

The ribbon of composite material may have a cross sectional height of at least 0.9 centimeters and a cross sectional width of at least 40 centimeters.

In at least one embodiment, an apparatus is provided which includes a substantially vertically oriented preform funnel; and at least one pair of extruding rollers; wherein the preform funnel is configured to receive fine fragments of composite material at a top opening, and to form a predetermined patterned preform of fine fragments of composite material within the preform funnel; wherein the preform funnel and the at least one pair of extruding rollers are configured with respect to each other such that the at least one pair of extruding rollers causes the predetermined patterned preform to be extruded out of a bottom opening of the preform funnel to form a ribbon of composite material; and wherein the at least one pair of extruding rollers is configured to cause a reinforcement film to be bonded to each of at least two major surfaces of the ribbon of composite material.

BRIEF DESCRIPTION OF THE DRAWINGS

FIG. 1 is a flow chart of a method in accordance with at least one embodiment of the present invention;

DETAILED DESCRIPTION OF THE INVENTION

Figure 2:
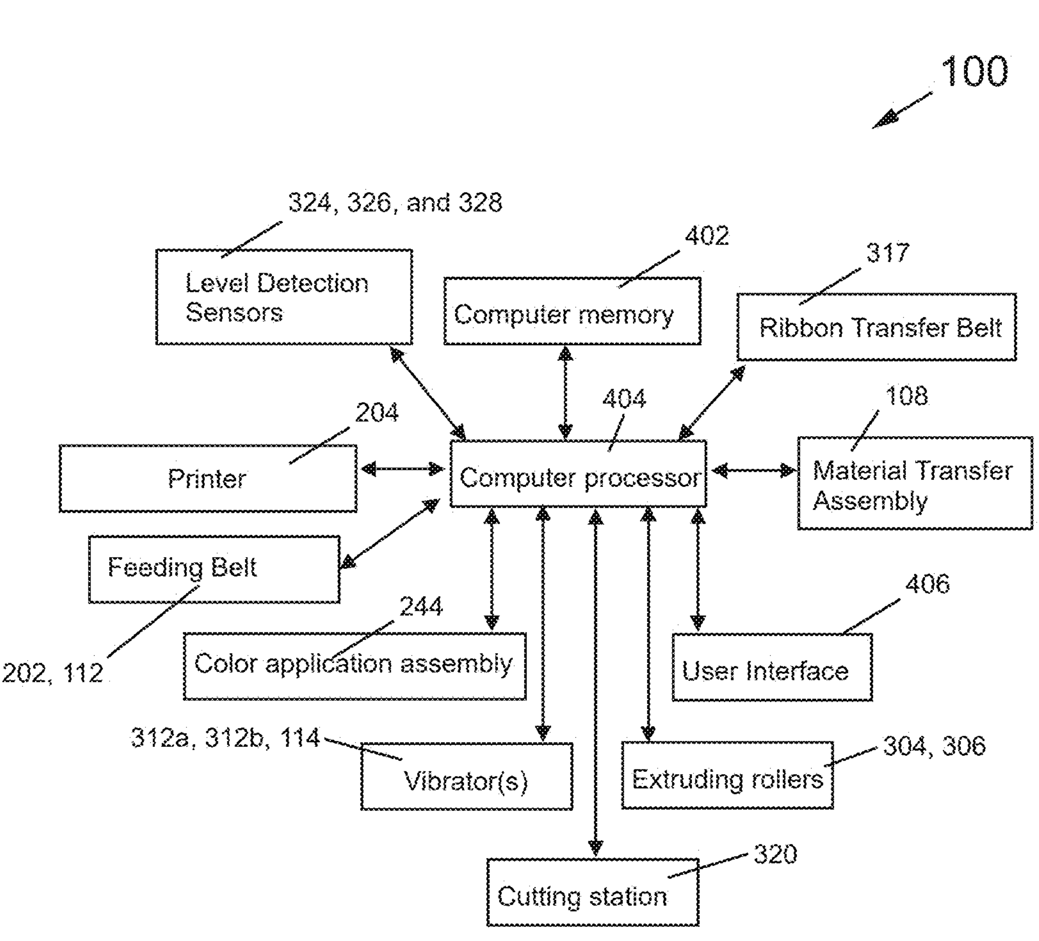
FIG. 2 is a simplified block diagram of components for use with at least one embodiment of the present invention.

FIG. 2 is a simplified block diagram 100 of components for use with at least one embodiment of the present invention. The diagram 100 includes computer memory 402, user interface system 406, printer 204, feeding belt 202 and 112, color application assembly 106, vibrators 312*a*, 312*b* and 114, cutting station 320, extruding rollers 304 and 306, material transfer assembly 108*a*. 108*b*, and 109, ribbon transfer belt 317, angle adjustment assemblies 110, 110*a* and 110*b*, and level detection sensors 324, 326, and 328 all of which communicate with and are configured to be controlled by computer processor 404 in accordance with computer software stored in computer memory 402, and in response to input from user interface system 406, which may include a computer monitor, computer touchscreen, keyboard and/or computer mouse.

Figure 3:
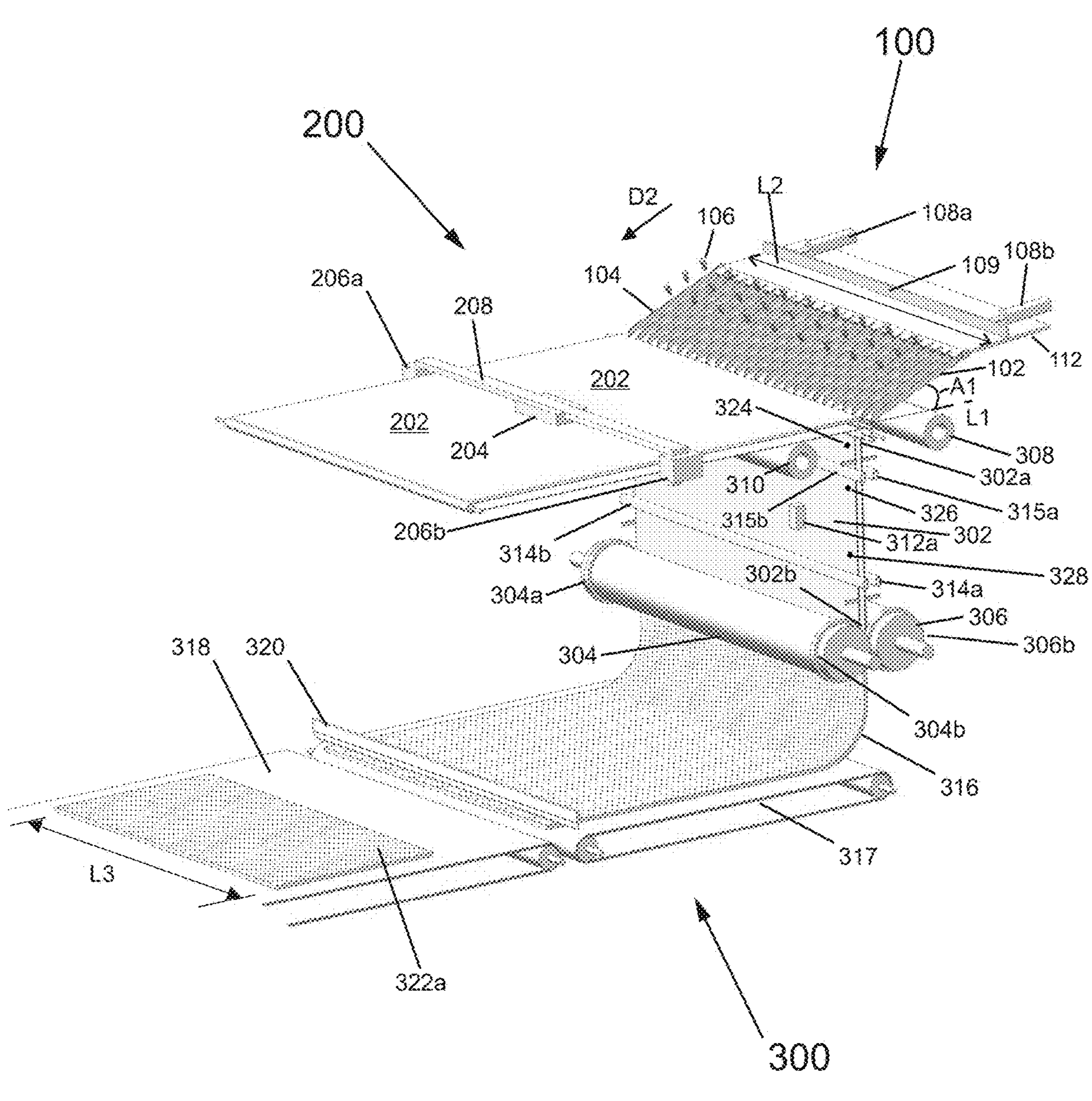
FIG. 3 is a perspective view of an apparatus for use with at least one embodiment of the present invention.

FIG. 3 is a perspective view of a color blending plate apparatus 100, printing apparatus 200, and extruding rollers apparatus 300 for use with at least one embodiment of the present invention. The color blending plate apparatus 100 includes color blending plate 102, guide rails 104, color depositing devices 106, a material transfer assembly 108, and a supporting structure 112. The printing apparatus 200 includes supporting structure 202, printer 204, printer supporting structures 206*a* and 206*b*, and printer gantry 208. The extruding rollers apparatus 300 includes preform funnel 302, extruding rollers 304 and 306, extruding roller rims 304*a*, 304*b*, 306*a* and 306*b*, film rolls 308 and 310, vibrators 312*a* and 312*b*, preform funnel supports 314 and 315, extruded composite material ribbon with film reinforcement 316, supporting structure 318, and cutting station 320.

Uncured slab 322*a* is also shown in FIG. 3, after being cut by cutting station 320 from the ribbon 316.

The color application assembly 106, may be a color application system which may include spray guns, robotic arms, gantries, and other such structures to regulate the location, orientation and timing of solid or liquid colorant deposition. The color application assembly or system 106 may be manually operated, semi-automated, or fully automated, such as for example through control of computer processor 404, through programming in computer memory 402.

Each of vibrators 114, 312*a* and 312*b* may be or may include a motor or other structure that generates controlled vibratory energy to a mold or supporting structure to promote movement, settling, or compaction of a material within a mold or supporting structure such as preform funnel 302 or color blending plate 102.

The cutting station 320 may be or may include a blade, cutting wheel, roller or other such cutting structure supported by or movable along a gantry rail or other positioning structure to cut, slice or separate a length of material into segments of desired length.

The material transfer assembly 108 may be or may include a structure configured to advance material from a deposition region to a downstream processing area. The material transfer assembly 108 may include a reciprocating pusher having a plate supported by one or more motors, a conveyor belt, or other such structure configured to move material along a defined path.

The angle adjustment assembly 110 may be or may include a first and second platform joined by an articulating joint, wherein one or more actuators or other such structures may apply a force to at least one of the platforms to adjust the angle between the platforms.

The user interface system may be or may include a user interface configured to receive input from an operator and provide output.

Figure 4:
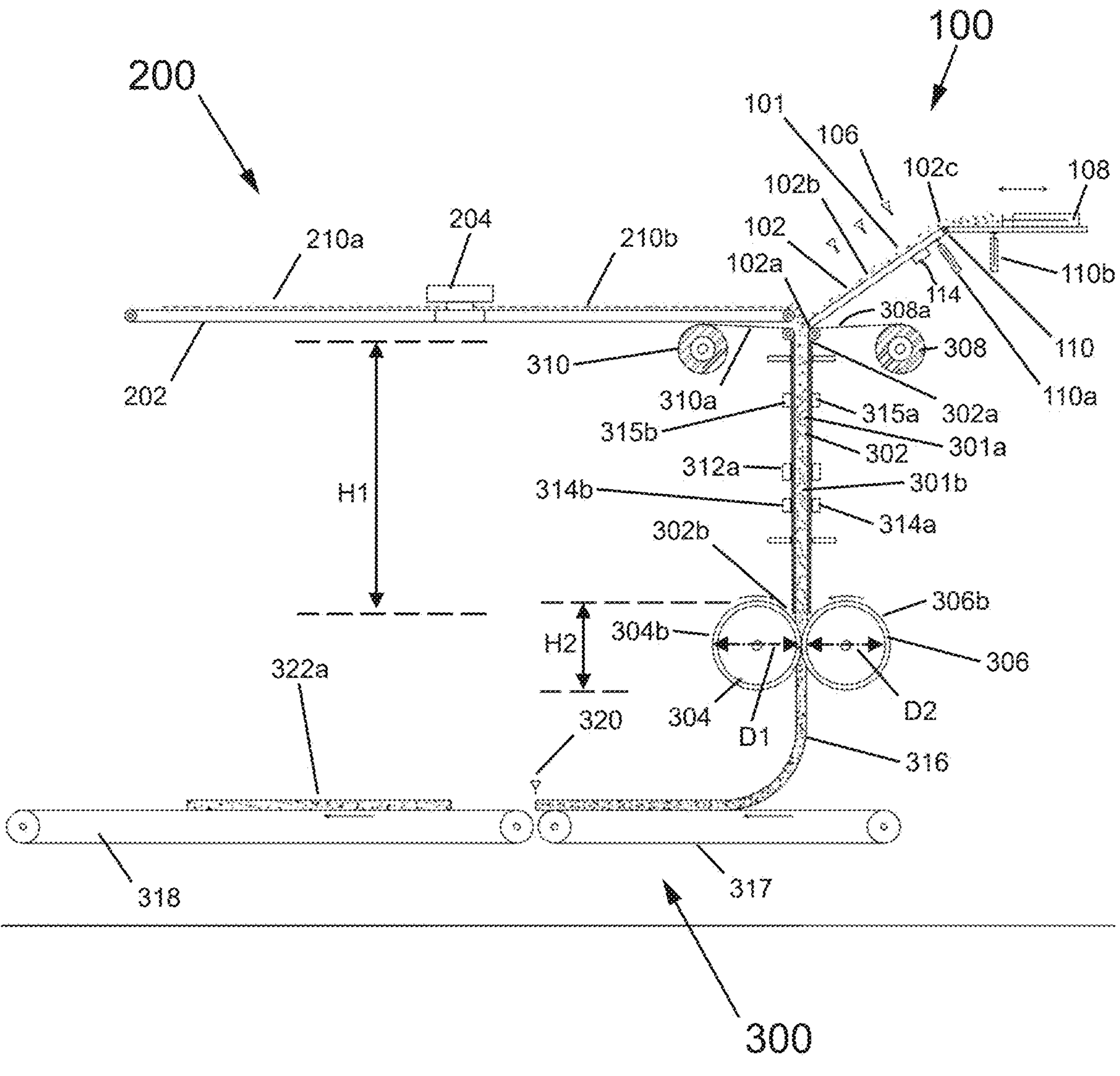
FIG. 4 is a side view of the apparatus of FIG. 3.

FIG. 4 is a side view of the apparatus 100, the apparatus 200, and the apparatus 300 of FIG. 3. Film 308*a* and 310*a* are dispensed from film rolls 308 and 310 respectively. Also visible are fine fragments 101 that are traveling down the color blending plate 102, a thin layer of fine fragments 210*a* before printer 204 prints on the fragments, a thin layer of fine fragments 210*b* after printer 204 prints on the fragments, angle adjustment assemblies 110, 110*a* and 110*b*, two layers of fine fragments inside the preform funnel 301*a*, 301*b*. and vibrator 114.

Figure 5:
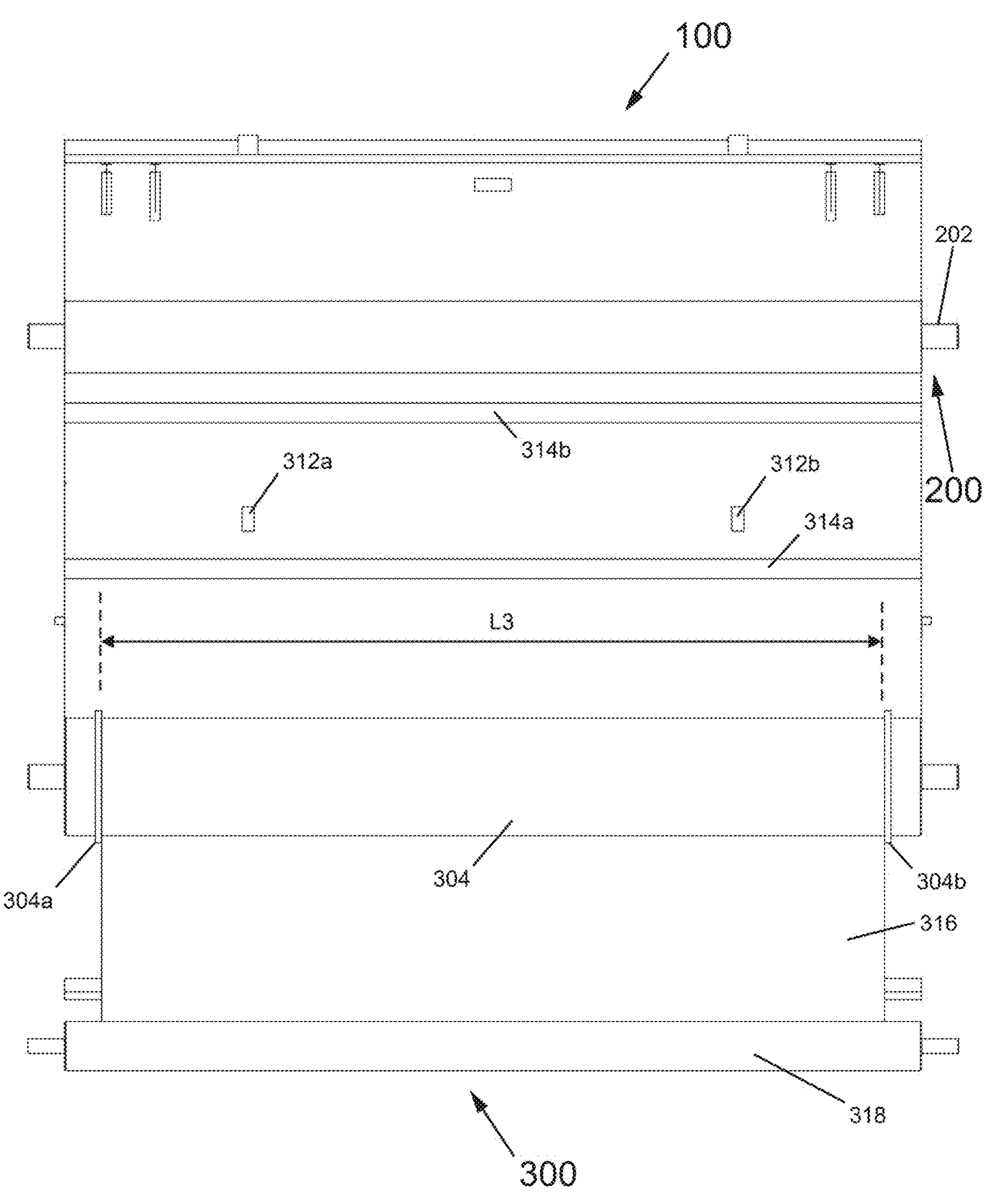
FIG. 5 is a front view of the apparatus of FIG. 3.

FIG. 5 is a front view of the apparatus 100, apparatus 200, and apparatus 300 of FIG. 3.

Figure 6:
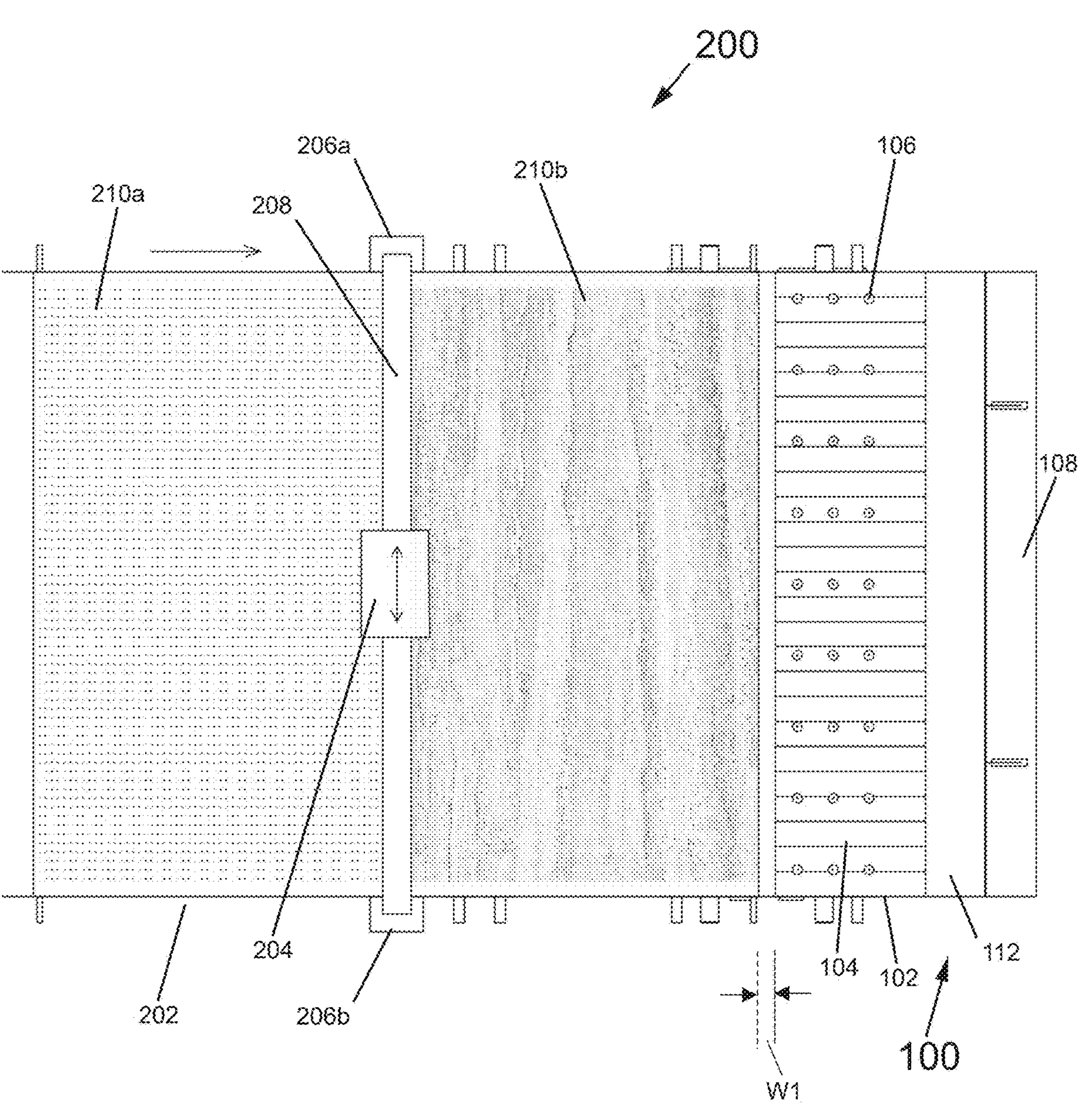
FIG. 6 is a top view of the apparatus of FIG. 3.

FIG. 6 is a top view of the apparatus 100, and the apparatus 200, wherein the apparatus 300 of FIG. 3 is underneath the apparatus 100 and 200, and typically is not visible in FIG. 6.

Figure 7:
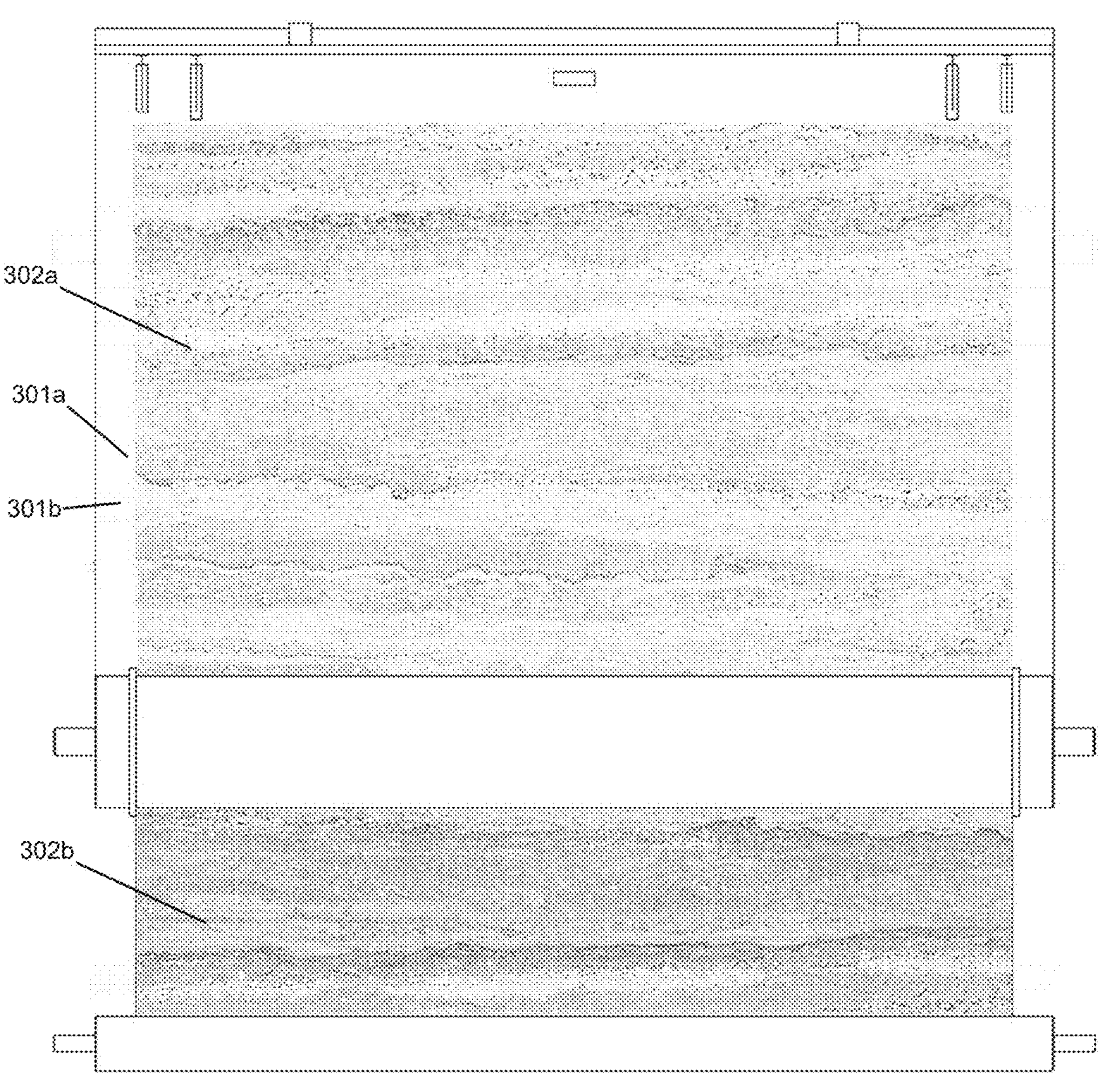
FIG. 7 is a partial section view of an extruding rollers apparatus 300, which is part of the apparatus of FIG. 3, in which layers of fine fragments have been deposited into a preform funnel to form a predefined pattern of layers of fragments.

FIG. 7 is a partial section view of the apparatus 300, showing the inside of the preform funnel 302 as it is filled with layers of fine fragments 307*a*. 307*b* shows the fine fragments after being extruded by the extruding rollers 304 and 306, and has a slightly different appearance than 307*a* due to the denser nature of the material.

FIG. 1 is a flow chart 1 of a method in accordance with at least one embodiment of the present invention. At step 2, shown in FIG. 1, an engineered stone mixture, which has been previously prepared according to a specific formula, is crushed using a lump breaker to obtain fine fragments of a predetermined size range. (This lump breaker is not shown in the drawings.)

If a "color blending plate embodiment" method is being implemented, as indicated at step or indicator 4, in FIG. 1, the process proceeds to step 6.

At step 6, the fine fragments are distributed into different regions along the L2 length of supporting structure 112 by computer control, such as by computer processor 404 of FIG. 2.

At step 8, these fine fragments are then deposited onto the color blending plate 102 shown in FIG. 3. The fine fragments may be pushed from supporting structure 112 by a material transfer assembly 108, or transferred by supporting structure 112 if supporting structure 112 is a conveyor feeding belt. The color blending plate 102 in at least one embodiment, is preferably at an angle A1 with respect to the structure supporting structure 112, which is parallel to dashed line L1, as shown in FIG. 3, so that gravity assists in the rolling and sliding of the fine fragments as shown in FIG. 4 down the color blending plate 102 in the direction D2 shown in FIG. 3 towards the supporting structure 112. The steeper the angle A1 of the color blending plate 102, the faster the fragments travel. Angle adjustment assembly 110 may be adjusted by means such as 110*a* and 110*b* to alter the angle A1.

At step 10, as the fine fragments roll and slide from the high end of the color blending plate 102 labeled as 102*c* in FIG. 4 to the low end of the color blending plate 102 labeled as 102*a* in FIG. 4, a computer-controlled (such as by computer processor 404) powder colorant dispensing or liquid colorant spraying device or color depositing assembly 106 referred to in FIG. 3 may deposit color or colorant to the various regions as the fine fragments travel down the color blending plate 102. The color depositing occurs in the region between 102*c* and 102*a*, labeled by 102*b* in FIG. 4. The timing of this color depositing may be synchronized with the angle A1 of the color blending plate 102 or speed at which the fine fragments are traveling down the color blending plate 102 so that specific regions of the fine fragments receive specific amounts of various colorant.

This process ensures the fine fragments are coated with specific colors, color quantities, color types, and color combinations (or remain uncolored in designated areas) during their movement down the color blending plate 102. This process also ensures that only specific regions or portions of the fine fragments are coated with the desired colorant and amount of colorant as to form a continuous pattern when further processed in the next step.

At step 12, of FIG. 1, the fine fragments may then be deposited into a large rectangular shaped funnel 302 shown in FIG. 3, which also acts as a rigid forming cavity that houses the fine fragment preform. This preform funnel 302 features an open end 302*a*, shown in FIG. 4, at a top of preform funnel 302, and an open end 302*b*, shown in FIG. 4 at a bottom of preform funnel 302

Fine fragments are fed into the preform funnel 302 via the bottom of color blending plate 102, labeled as 102*a* in FIG. 4, and the mixture of fragments are extruded out the preform funnel 302 via the bottom opening 302*b* by a pair of extruding rollers 304 and 306. The preform funnel 302 may further be defined by two short sides W1 in FIG. 6, two long sides L3 in FIG. 5, and a predetermined height H1, shown in FIG. 4 (from the top opening 302*a* to the bottom opening 302*b*). In at least one embodiment, the short sides W1 have a length of about 0.9 cm to 9 cm, the long sides L3 have a length of about 40 cm to 400 cm, and the predetermined height H1 may have a length of about 20 cm to 400 cm. The preform funnel 302 may be adjusted so that the short side of the bottom end (adjacent opening 302*b*) of the preform funnel 302 is slightly shorter than the short side of the top end of the preform funnel 302, forming a configuration that is slightly wider at the top (adjacent opening 302*a*) and narrower at the bottom (adjacent opening 302*b*). The major surfaces formed by the long sides L3 and the height, H1, may be constructed by thick tempered glass, acrylic, or other such transparent material to enable viewing of the fragments being deposited and the layered pattern being formed within the preform funnel 302 from outside, which in one or more embodiments, may be preferred. The transparent walls may be reinforced with steel beams or other stiffeners 314 and 315 so the weight of the fine fragments inside the preform funnel 302 do not break or bend the walls. The short sides W1 of the preform funnel 302 correspond to the thickness of the fragments of composite mixture that will be further fed into the pair of extruding rollers 304 and 306. The long sides of the preform funnel 302 L3 correspond to the length of the fragments of composite mixture that will be further processed into a slab, such as slab 322*a* shown in FIG. 3.

As this process is intended to be performed as a continuous run, the predetermined height H1 of the preform funnel 302 does not define the width of the fine fragments of composite mixture that will be further processed into a slab, such as slab 322*a* shown in FIG. 3. Rather, during a subsequent step of processing the resultant long ribbon, formed at step 14, may be cut at predetermined points to define the width of a slab, such slab 322*a*.

The preform funnel 302 may be equipped with rolls of high strength, low elasticity and ductility membranes such as PET (polyethylene terephthalate) film, paper film, fiberglass reinforced mesh, etc. that spans the entire long side L3 and height H1 of the preform funnel 302 on either side. This ensures that the fine fragments of composite mixture do not come into contact with the transparent walls as they travel through the preform funnel 302. More importantly, the film will also be pressed attached to the surface of the fine fragments layers as a reinforcement skin by a pair of extruding rollers in a subsequent step.

When a batch or layer of color-controlled mixture particles is deposited into the preform funnel 302 positioned beneath the lower edge 102*a* (shown in FIG. 4) of the color bending plate 102, the coated fine fragments form a distinct layer of mixed material fine fragments enveloped in specific colorants within the preform funnel 302.

The upper surface 102*b* of the color blending plate 102 may feature a series of raised guide channels or rails 104 directed from the high point 102*c* (shown in FIG. 4) of the color bending plate 102 to its low point 102*a* (shown in FIG. 4). These guide channels 104 on the top surface of the color blending plate 102 enable the mixture fine fragments to land relatively accurately within the designated discharge area along the length or long side of the preform funnel 302. This prevents the fine fragments released in a specific area from spreading out uncontrollably across a larger area as the fine fragments travel down the color blending plate 102. If the fragments were to be released onto a flat surface without directional guide channels 104, they would tumble out of the areas they were deposited in, gradually spreading into an unmanageable, large-area discharge zone by the time they reach the bottom 102*a* of the color blending plate 102.

A second batch or layer of fine fragments are deposited onto the color blending plate 102 according to design requirements and methods as described above. During the fragments' travel down the color blending plate 102, additional colorant is applied and the mixing is performed in a controlled manner.

A further plurality of batches or layers of fine fragments may be deposited into the preform funnel 302 in this manner, in at least one embodiment, preferably, until the height of the material in the preform funnel 302 reaches a preset height. The color, region deposited along the length L1, and amount in each of the batches or layers may be coordinated to achieve various continuous striations or color or veining effects throughout the length L3 and height H1 of the preform funnel 302 to closely simulate the coloration, color transition and veining found in some natural stones. In this manner, a series of layers such as 301*a*, 301*b*, etc. may be obtained. It's important to note that not all the layers need to consist of material that spans the entire length L3, and not all layers may have the same amount of material or height, according to the desired final design aesthetic. Some layers may consist of very thin or little amount of material, and some layers may consist of thicker layers of more material. In addition, some layers may intentionally have regions along the length of L3 that have more, less or no fine fragments deposited to emulate as many varieties in natural stone as possible in a controlled manner. Another color blending plate, similar or identical to color blending plate 102 may be positioned on the other side of the preform funnel 302 replacing printing apparatus 200 in FIG. 3, and coordinated so that the system of two color blending plates are depositing fine fragments into the preform funnel 302 in a coordinated manner.

In this manner, a continuous pattern or design may be formed within the preform funnel 302 in such a manner as to obtain a predefined patterned preform 307*a*. There may be an element of randomness associated with this pattern as the material is deposited into the preform funnel 302 from a height, which may cause some mixing or displacement. However, in general a predetermined pattern containing specific color tones and color combinations may be achieved. This patterned preform containing specific color tones and color combinations may have a similar appearance to the fine fragments before being deposited into preform funnel 302 such as 210*b* and 101, however due to the randomness associated with dropping the fine fragments from a height, the predetermined pattern will generally be substantially predetermined, i.e. there will be typically some element of randomness in the predetermined pattern, and attempts to achieve precisely the same predetermined pattern every time will generally fail. The predetermined amount, color, and order of fine fragments deposited into the preform funnel 302 by means such as color blending plate apparatus 100 and/or printing apparatus 200 leads to a predetermined preform pattern containing specific color tones and color combinations within the preform funnel 302.

Preform funnel 302 may be equipped with vibrators such as 312*a* and 312*b*. As the fine fragments are deposited into the preform funnel 302, there may be a tendency for air gaps to form when depositing subsequent layers. The vibration amplitude, activation timing, and duration can be coordinated with the apparatuses 100 and/or 200 to ensure a uniform density within the preform funnel 302.

In at least one embodiment, the open end 302*b* at the bottom of the preform funnel 302 is preferably equipped with a pair of parallel extruding rollers, such as rollers 304 and 306 of approximately equal height, H2, shown in FIG. 4. These rollers 304 and 306, in at least one embodiment, preferably extend slightly beyond the length or long side of the preform funnel 302, with the distance between the rollers 304 and 306 set to be narrower than the short side W1 of the preform funnel 302, but wider than the intended thickness of the resultant final slab after undergoing the subsequent vacuum and compression process. This ensures that fine fragments and PET film are continuously pulled down to feed the pair of extruding rollers 304 and 306, while not compacting the material to the extent that the subsequent vacuum vibration press machine does in a subsequent step, such as step 20 of FIG. 1. The extruding rollers 304 and 306 serve the functions of compacting the material while at the same time shaping the material into a desired profile. Typically, in at least one embodiment, the width or short side of the cavity W1 of the preform funnel 302 must be larger than the resultant distance between the extruding rollers 304 and 306, which in turn must be larger than the thickness of the slab 322*a* after undergoing the subsequent vacuum and compression process. In addition, the width or short side of the cavity W1, typically in at least one embodiment, must not be too much wider than the rim (304*b* or 306*b*) diameter D1 shown in FIG. 4, minus the extruding roller (304 or 306) diameter D2 shown in FIG. 4, otherwise the excess material being fed into the extruding rollers 304 and 306, will result in the pattern formed in the layers of fine fragments in the preform funnel 302 to be too distorted or stretched. When processing through the extruding rollers 304 and 306, some degree of distortion or stretching is inevitable. To minimize this, parameters and characteristics of the extruding rollers 304 and 306 may be adjusted, and the design of the patterned preform 307*a* may be predetermined to be compatible with the distortion upon processing by the extruding rollers 304 and 306 to achieve a desired predetermined pattern 307*b* within the ribbon 316 which is substantially the same as the predetermined patterned preform 307*a* prior to processing by the extrusion rollers.

The diameter D2 of the extruding rollers 304 and 306, may be significantly larger than the short side of the preform funnel 302 (i.e., the thickness of the pre-extruded material layer) to ensure that during the extrusion process the deformation of the fine fragments layer primarily involves compacting the loosely packed material layer within the cavity between the two rollers 304 and 306 and minimizing deformation or stretching of the already formed pattern in the layers in the upstream H1 direction. Typically, this requires the diameter D2 of the extruding rollers 304 and 306, to be as large as possible. If the extruding rollers 304 and 306 are too small of a diameter D2, there will be a tendency to push the fragments upward and stretch the pattern embedded into the layers as opposed to compressing the material together.

Once the material in the preform funnel 302 reaches a preset height, the extruding rollers 304 and 306 and a horizontally oriented conveyor belt 317, shown in FIG. 3, below the extruding rollers 304 and 306 are activated to pull down this layer of mixed fine fragments, including the PET films on either side. The rollers 304 and 306 begin to rotate, forcing the layer of mixture through the preform funnel's bottom opening 302*b* and compressing the fragments between the extruding rollers 304 and 306 into a dense, continuous ribbon, at step 14 of FIG. 1. The viscous resin in the mixture also causes the PET film on either side of the ribbon to be pressed to or be bonded to the ribbon. In this manner, the fine fragments of composite material may be processed in a method similar to a continuous extrusion process. The preform funnel 302 acts as a rigid forming feed cavity that generally shapes the material into dimensions that are suitable to be processed by the extruding rollers 304 and 306 while still maintaining the desired colored and layered patterns that are formed during the colorant and fine fragments depositing steps. The rotating speed of each extruding roller 304 and 306 may be controlled to be the same to grip and pull the mixture of fragments together with the PET films. The feeding speed of the fine fragments into the preform funnel 302 may be coordinated with the extruding speed of the material from the bottom 302*b* of the preform funnel 302 so that there are enough fine fragment layers formed in the preform funnel 302, forming a continuous process.

If greater extrusion force is required to pull the fine fragment layers through the preform funnel's lower opening 302*b*, a larger diameter of the extruding rollers 304 and 306 could be used, and/or nonsmoothed surface of the extruding rollers 304 and 306 could be used, and/or multiple pairs of extruding rollers may be employed.

The film ideally has high strength and low elasticity and ductility. They are adhered to either side of the compressed mixture of fragments by the extruding rollers 304 and 306, and subsequently act as a form of reinforcement or support to the compressed mixture ribbon so that the ribbon is pliable and could be moved around without breaking apart. The compacted continuous ribbon then descends or freefalls onto the moving horizontal conveyor belt 317 which is positioned underneath the pair of the extruding rollers. The speed of the conveyor belt 317 may be synchronized with the speed of the extruding rollers 304 and 306 to transport the ribbon 316 downstream. As the ribbon is still slightly pliable and the adhesive properties of the ribbon cause it to be stuck to the PET films, the ribbon will not substantially break, fracture or crumble as it undergoes this vertical to horizontal supported transfer or freefall without any support due to the compressed resin content in the mixture and the support provided by the reinforcing film. The angle in which this transfer occurs may also be adjusted to prevent substantial breakage. Moreover, the continuous ribbon essentially retains its original shape and color and vein pattern during this vertical to horizontal transfer. This fundamentally distinguishes these color and veining formation manufacturing methods from other rigid building materials made from dry powders without resin content such as ceramic tile, cement boards, or glass panels. For example in ceramic tile manufacturing process, dry powder particles (with about 6% water content) are used to form a rigid blank, and then pressed and/or fired into a ceramic tile.

The ribbon is then transferred to a cutting station 320 at step 16 of FIG. 1. The ribbon is then cut by cutting station 320 to the predetermined slab width, at step 18 of FIG. 1, forming individual uncured slab 322*a* to be processed by a vacuum vibration press, not shown. At step 20, the uncured slab 322*a* is subsequently fed into the vacuum vibration press, for compaction; further conveyed into a curing oven, for hardening; and finally, after polishing and trimming, at step 24, the finished engineered stone slabs are produced.

The angle A1 of the color blending plate 102 can be adjusted as needed. A steeper slope (e.g., about 75 degrees) accelerates the descent of fine fragments, making thorough application of colorant harder to control but increasing production speed. A shallower slope (e.g., about 15 degrees) prolongs the fragments descent time down the color blending plate 102, facilitating better control for thorough application of colorant but slightly reducing production speed. The vibrator 114, shown in FIG. 4, may be configured on the back of the color blending plate 102. The vibration amplitude, activation timing, and duration can be coordinated with the color blending plate's angle, along with the feed rate of each region and the corresponding colorant deposition, all controlled by computer processor 404. This ensures more uniform and thorough surface coating of the colorant as the fine particles tumble and bounce down the plate 102.

The method in which the mixed fine fragments are deposited on to the color blending plate 102 may be modified according to design requirements of the current layer or batch being processed. First, the fine fragments may be arranged on the temporary support 112, shown in FIG. 3, close to the edge of the beginning 102*c* of the color blending plate 102. The amount of the fine fragments placed along the length L2 of the temporary support 112 may vary at any given distance according to design requirements. In this manner, some regions across the length of L2 may intentionally have less or no material. The material transfer assembly 108 may include a plate 109, which may be configured to be pushed by reciprocating or expanding/contracting arms 108*a* and 108*b*, shown in FIG. 3. In at least one embodiment, the plate 109 is configured to have a length, L2, which is slightly longer than the length of the color blending plate 102. The plate 109 and reciprocating or expanding/contracting arms 108*a* and 108*b* are configured, in at least one embodiment to push the batch or layer of prepared fine fragments from the temporary support 112 onto the color blending plate 102 at a preset speed. The pushing plate and temporary support may be replaced by a material feeding conveyor belt controlled by the computer. Simultaneously, the color depositing assembly 106 and/or vibrators 114 are activated to apply color to the surfaces of the fine fragments as they tumble and slide down the color blending plate 102.

Various other methods such as the methods described in XIE, U.S. Pat. No. 10,399,257 to Xie, and U.S. Pat. No. 9,511,516, to Xie, each of which are incorporated herein in their entirety by reference, and the methods of these patents may be implemented to feed material one zone or batch at a time.

The extruding rollers 304 and 306, in at least one embodiment, are typically equipped with rims 304*b* and 306*b*, made of steel positioned on either end of the two extruding rollers 304 and 306, so that each of the pair of rims 304*b* and 306*b* are in contact with each other, or substantially closer to each other. The outer diameter, D1, shown in FIG. 4 of each of rims 304*b* and 306*b*, minus the diameter D2 of the extruding rollers 304 and 306 is the thickness of the desired resultant ribbon thickness. The position of the rims 304*b* and 306*b* installed along the length of the extruding rollers 304 and 306 also defines the width L3 of the ribbon, therefore prevents the fine fragments from spilling out the sides of the ribbon as the extrusion process is occurring.

A flow control gate, not shown, may be placed close to or at the exit of preform funnel 302*b* with about the same dimensions as the bottom of the preform funnel 302. This gate device may be used to block the fine fragments of composite material mixture from spilling out of end 302*b* while the preform funnel 302 is being initially loaded with material. Once a desired height of fragments is accumulated in the preform funnel 302, the gate device may be removed so that the material may then be processed by the extruding rollers 304 and 306. As the fragments are deposited into the preform funnel 302, there is a tendency due to the weight of the fragments on top of each other to compress the fragments. This compression is less than the amount of compression the fragments experience as they pass through the extruding rollers 302 to form a ribbon. In addition, the viscous, sticky nature of the resin will cause the fragments to not spill out the bottom of the preform funnel 302 like dry sand, and the friction generated between the fragments and the side walls of the preform funnel 302 may also prevent excess spillage.

The flow control gate, not shown, may be or may include a plate or other such structure that is configured to selectively obstruct or permit passage of material through an opening.

The preform funnel 302 may be oriented in a vertical orientation, 90 degrees from horizontal. In alternative embodiments the preform funnel may be oriented in a substantially vertical orientation, about +/−30 degrees or preferably about +/−10 degrees from vertical. In another embodiment, the preform funnel 302 may be oriented in a substantially non-horizontal orientation, between about 30 and about 90 degrees from horizontal. Regardless of angle, the extruding rollers 304 and 306 should be positioned in such a manner so that when the layers of fine fragments pass through the extruding rollers 304 and 306, there is not a pressure difference that causes material from one side of the preform funnel 302 to pass through faster than the other side.

When producing finished slabs that measure about 3 cm in thickness using the methods of this invention, the dimensions of the ribbon in some embodiments may be approximately 1.6 m×3.2 m (meters)×3.5 cm. The weight of this amount of composite material may exceed 430 kg (kilograms), and the specific gravity may be approximately 2.4. The frictional forces exerted by the mixture of fine fragments against the side walls of the preform funnel exceeds gravitational forces acting upon the mixture. In addition, the viscous nature of the resin in the mixture causes additional frictional forces. Therefore, the extruding rollers 304 and 306 require sufficient force to overcome the friction between the mixture of fine fragments and the side walls of the preform funnel 302 in order to drag the fine fragment layers out of the lower opening of the preform funnel 302.

The roll of PET film may be equipped with brakes, not shown, or some other form of resistance or added friction so that the amount of PET film dispensed may be adjusted. In some embodiments, if too much PET film is dispensed this will cause wrinkles in the film and subsequent ribbon as the PET film and fine fragments pass through the extruding rollers 304 and 306. If the weight of the mixture of fine fragments inside the preform funnel 302 causes the material to travel too quickly through the bottom opening of the preform funnel 302, the friction of the brakes may be adjusted to slow down the process.

In an alternative embodiment as shown in step 22 of FIG. 1 titled Printing Embodiment, a supporting structure such as conveyor belt is positioned above the preform funnel 302. Fine fragments obtained by a means such as composite material passing through a lump breaker are deposited onto the feeding belt 202 in a controlled manner so that the fine fragments are evenly laid on the belt in a thin layer. Alternatively, specific amounts of material may be deposited along the length L2 at various times so that at any given point and time across feeding belt 202 there may be regions where the thin layer is missing. The width of the feeding belt 202 may correspond to the long side or L3 of the preform funnel 302, and the feeding belt 202 may be positioned so that the layer of fine fragments are deposited into the preform funnel 302. The printer 204 may be positioned above the feeding belt 202 in order to print an image or pattern onto the surface of the thin layer of fine fragments. For example, an image or a modified image of a slab of travertine, other layered stone, or other pattern may be printed onto the thin layer of fragments. This layer of fine fragments may then be deposited into the preform funnel 302 to form layers with predetermined color tones and color combinations similar to the image printed. The thin layer of fine fragments are shown in FIG. 6 labeled as 201*a* prior to having an image printed onto them by printer 204, and after the printer has printed an image on them as labeled by 210*b*.

The printer 204 may be a digital printer, inkjet printer, laser printer, thermal printer, and/or may use other such printing technologies that allow for receiving print data and for depositing colorant onto a substrate in accordance with the print data so as to form a visible pattern or image according to the print data on the substrate. The printer may deposit solid particle(s) or powder colorant(s) as an alternative or in combination with liquid colorant. In the case of solid particle(s) or powder colorant(s), the resolution of the printed pattern or image may generally be much lower than of a traditional inkjet or digital printer.

The thickness of the layer of fine fragments laid on the feeding belt 202 is generally much smaller than the width or short side of the preform funnel 302, which corresponds to the thickness of the resultant slab. In addition, the pattern printed on the surface of the layer of fragments will be mixed together or destroyed as the material falls into the preform funnel 302. However, the multi-color tone will blend during freefall and be retained in the layer of material that falls into the preform funnel 302, controllably forming a layer of material with a desired color combination that has elements of randomness.

The printing apparatus 200 may be continuously run to continue to deposit additional colored or printed layers of fine fragments into the preform funnel 302. In this manner, distinct or discrete layers may be formed, or gradual color transitions between layers may be obtained depending on the design requirements.

This system of printing apparatus 200 may be used in combination with or in replacement of either one or two of the color blending plate apparatus 100. FIG. 3 shows an embodiment in which a printing apparatus 200 is used in combination with a color blending plate apparatus 100. The printing head 204 of the printing apparatus 200 shown in FIG. 3, may oscillate back and forth along the width of the fine fragments or feeding belt 202 and the printing speed may be coordinated with the speed of the feeding belt 202 to print a desired pattern.

Any combination thereof, specifically one color blending plate apparatus 100, one printing apparatus 200, two color blending plate apparatuses 100, one color blending plate apparatus 100 and one printing apparatus 200, or two printing apparatus 200 may be used to deposit material into the preform funnel 302. Any combination of the individual or two apparatuses may be coordinated with itself or with other apparatuses 100 or 200 to deposit the correct amount of material and colorant into the preform funnel 302 in a manner such that a predetermined pattern is formed along the length W3 and height H1 of the preform funnel by the colored fine fragments.

In at least one embodiment, a computer processor controlled material level detection system may be installed on preform funnel 302. This may include material level detection sensors 324, 326 and 328 as shown in FIG. 3. As fine fragments are fed into the preform funnel 302, when the height of fine fragments exceeds sensor 326, the extruding rollers 304 and 306 are activated and begin to pull the fine fragments and PET films down through the bottom exit 302*b* in a continuous manner. At this state, the system is balanced in that the amount of material entering preform funnel 302 by being deposited into 302 is equal to the amount of material exiting the preform funnel 302 by being extruded out of 302*b* by means of extruding rollers 304 and 306.

If the system is not in balance and the height of the fine fragments is lower than sensor 328, the extruding rollers 304 and 306 may stop until the height of the fine fragments reaches sensor 326. Alternatively, if the height of the fragments reaches sensor 324, the feeding of fine fragments into preform funnel 302 may be stopped until the height of the fine fragments reaches sensor 326.

The printing apparatus 200 may be replaced with a manual method of one or more color depositing assemblies or systems such as a spray gun or similar. In these embodiments, an image may not be printed but rather colorant may be deposited in regions in a controlled manner.

In at least one embodiment the shape of the cross section of the preform funnel 302 may be a perfect rectangle, or substantially rectangular with for example rounded edges or rounded minor sides, or other shapes, as long as the extruding rollers may further process the fine fragments into a ribbon with dimensions that are suitable to be converted into resultant slabs.

In at least one embodiment, the fine fragments may be deposited into the preform funnel through an opening on the major surface of the preform funnel as opposed to a top opening to load the preform funnel with composite material to be extruded.

In at least one embodiment, the feeding belts and ribbon transfer belts 112, 317, 202 may be a supporting structure such as a mold, tray, film, or conveyor belt equipped with a means of transporting the material from one location to another.

This system overcomes the limitation of previous systems in which molds are required to form engineered stone slabs with appearances that simulate natural stone, and the necessity for the use of molds to rotate from a vertical to horizontal orientation. In this color and veining formation system of engineered stone manufacturing, moveable molds are totally eliminated.

I claim:

1. A method for producing engineered stone comprising:

depositing fragments of engineered stone mixture into a substantially vertically oriented preform funnel to form a substantially predetermined patterned preform of fragments of engineered stone mixture;

wherein the substantially predetermined patterned preform of fragments of engineered stone mixture has a predetermined coloration pattern which is not uniform;

extruding the substantially predetermined patterned preform of fragments of engineered stone mixture out of a bottom opening of the preform funnel by use of at least one pair of extruding rollers to form a ribbon of engineered stone mixture;

wherein the preform funnel maintains the predetermined coloration pattern of the substantially predetermined patterned preform of fragments of engineered stone mixture; and wherein the at least one pair of extruding rollers is configured to cause a reinforcement film to be pressed onto each of at least two major surfaces of the ribbon of engineered stone mixture.

2. The method of claim 1 further comprising reorienting the ribbon of engineered stone mixture from a substantially vertical orientation to a substantially horizontal orientation, after the ribbon of engineered stone mixture has been extruded out of the bottom opening of the preform funnel, and after the reinforcement film has been pressed onto each of at least two major surfaces of the ribbon of engineered stone mixture.

3. The method of claim 2 further comprising:

cutting the ribbon of engineered stone mixture after the ribbon of engineered stone mixture has been extruded out of the bottom opening of the preform funnel, after the reinforcement film has been pressed onto each of at least two major surfaces of the ribbon of engineered stone mixture, and after the ribbon of engineered stone mixture has been reoriented from the substantially vertical orientation to the substantially horizontal orientation; and wherein the step of cutting the ribbon of engineered stone mixture includes cutting the ribbon of engineered stone mixture to a predetermined length to form an uncured slab.

4. The method of claim 3 further comprising:

subjecting the uncured slab to a vacuum, vibration and compression process to form a compressed uncured slab;

curing the uncured slab into a hardened slab; and trimming and polishing the hardened slab to form a finished slab.

5. The method of claim 3 wherein:

the step of cutting the ribbon of engineered stone mixture includes cutting the ribbon of engineered stone mixture to form two uncured slabs, each having a predetermined length.

6. The method of claim 3 wherein:

the step of cutting the ribbon of engineered stone mixture includes cutting the ribbon of engineered stone mixture to form a plurality of uncured slabs, each having a predetermined length.

7. The method of claim 1 wherein:

the pattern of the ribbon of engineered stone mixture, after being extruded from the at least one pair of extruding rollers, is of an appearance which is substantially the same as the predetermined patterned preform.

8. The method of claim 1 further comprising fragments of engineered stone mixture are continuously deposited into the preform funnel as the at least one pair of extruding rollers extrudes the fragments of engineered stone mixture.

9. The method of claim 1 wherein:

after the at least one pair of extruding rollers begins to extrude the fragments of engineered stone mixture, a low level detection sensor detects the height of the fragments in the preform funnel, and stops the extruding rollers when the height of the fragments reaches a minimum threshold level for the low level detection sensor.

10. The method of claim 1 wherein:

after the extruding rollers begin to extrude the fragments of engineered stone mixture, a high level detection sensor detects the height of the fragments in the preform funnel, and starts the extruding rollers when the height of the fragments reaches the maximum threshold height for the high level detection sensor.

11. The method of claim 1 wherein:

prior to being deposited into the preform funnel, the fragments of engineered stone mixture are controllably deposited onto a color blending plate; and controllably depositing colorant onto predefined regions of the fragments of engineered stone mixture as the fragments travel down the color blending plate.

12. The method of claim 1 wherein the ribbon of engineered stone mixture is resin and mineral filler based comprising a minimum of 6% resin and a minimum of 83% mineral filler by weight.

13. The method of claim 1 wherein the engineered stone mixture is damp when deposited into the substantially vertically oriented preform funnel, and when extruded out of the bottom opening of the preform funnel.

14. The method of claim 1 further comprising prior to depositing the fragments of engineered stone mixture into the preform funnel, depositing the fragments of engineered stone mixture onto a supporting structure, and depositing colorant onto at least some portion of the fragments of engineered stone mixture to form colored fragments of engineered stone mixture; and wherein the colored fragments of engineered stone mixture on the supporting structure are deposited into the substantially vertically oriented preform funnel as part of the fragments of engineered stone mixture.

15. The method of claim 14 wherein a printing device is used to deposit the colorant onto the at least some portion of the fragments of engineered stone mixture on the supporting structure.

16. The method of claim 1 wherein the reinforcement film lines the inside of the preform funnel.

17. The method of claim 1 wherein the reinforcement film is supplied, so that it spans from outside of a top opening of the preform funnel, into the top opening of the preform funnel, inside the preform funnel along the entire height of the preform funnel, so that the fragments of engineered stone mixture passing through the preform funnel do not come in contact with at least one inner wall of the preform funnel, and further the reinforcement film spans out from the bottom opening of the preform funnel, and then a part of the reinforcement film that has exited the bottom opening of the preform funnel is acted on outside of the preform funnel by the at least one pair of extruding rollers.

18. The method of claim 1 wherein the preform funnel is rectangular shaped.

19. The method of claim 1 wherein at least one wall of the preform funnel is transparent.

20. The method of claim 1 wherein the preform funnel has a width, a height, and a length;

wherein the width is between 0.9 centimeters and 9 centimeters;

wherein the height is between 20 and 400 centimeters; and and wherein the length is between 40 and 400 centimeters.

21. The method of claim 1 further comprising adjusting characteristics of the at least one pair of extruding rollers to minimize stretching between the substantially predetermined patterned preform of fragments of engineered stone mixture in the preform funnel and the substantially predetermined patterned preform of fragments in the ribbon.

22. The method of claim 1 further comprising adjusting characteristics of the at least one pair of extruding rollers to minimize distortion between a pattern in the preform funnel and a pattern in the ribbon.

23. The method of claim 1 wherein at least one extruding roller of the at least one pair of extruding rollers is equipped with a corresponding rim;

wherein the rim of the at least one extruding roller has an outer diameter; and wherein the at least one extruding roller has a diameter, such that the diameter of the at least one extruding roller subtracted from the outer diameter of the corresponding rim is equal to a thickness of the ribbon of engineered stone mixture.

24. The method of claim 1 wherein at least one extruding roller of the at least one pair of extruding rollers is equipped with a corresponding rim;

wherein the at least one extruding roller has a diameter which is less than a diameter of the corresponding rim so that the corresponding rim helps to prevent fragments of engineered stone mixture from spilling out of the ribbon while the substantially predetermined patterned preform of fragments of engineered stone mixture is being extruded out of the bottom opening of the preform funnel.

25. A method for producing engineered stone comprising:

depositing fragments of engineered stone mixture with at least one reinforcement film through a first opening into a substantially vertically oriented preform funnel to form a substantially predetermined patterned preform of fragments of engineered stone mixture with the at least one reinforcement film, wherein both the fragments of engineered stone mixture and the at least one reinforcement film are deposited into the first opening from the same direction;

extruding the substantially predetermined patterned preform of fragments of engineered stone mixture and the at least one reinforcement film out of a bottom opening of the preform funnel by use of at least one pair of extruding rollers to form a ribbon of engineered stone mixture; and wherein the at least one pair of extruding rollers is configured to cause the at least one reinforcement film to be pressed onto at least one of at least two major surfaces of the ribbon of engineered stone mixture.

* * * * *